(12) United States Patent
Lambert et al.

(10) Patent No.: US 9,043,872 B2
(45) Date of Patent: **\*May 26, 2015**

(54) SELECTIVE MANAGEMENT CONTROLLER AUTHENTICATED ACCESS CONTROL TO HOST MAPPED RESOURCES

(71) Applicant: Dell Products, LP, Round Rock, TX (US)

(72) Inventors: Timothy M. Lambert, Austin, TX (US); Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,554

(22) Filed: Jul. 31, 2013

(65) Prior Publication Data

US 2013/0318338 A1 Nov. 28, 2013

Related U.S. Application Data

(63) Continuation of application No. 12/762,671, filed on Apr. 19, 2010, now Pat. No. 8,528,046.

(51) Int. Cl.
| | |
|---|---|
| *G06F 21/00* | (2013.01) |
| *G06F 21/57* | (2013.01) |
| *G06F 11/22* | (2006.01) |
| *G06F 12/14* | (2006.01) |
| *H04L 9/30* | (2006.01) |
| *G06F 21/72* | (2013.01) |
| *G06F 21/78* | (2013.01) |

(52) U.S. Cl.
CPC .......... *G06F 21/572* (2013.01); *G06F 11/2284* (2013.01); *G06F 12/1408* (2013.01); *H04L 9/30* (2013.01); *G06F 21/575* (2013.01); *G06F 21/72* (2013.01); *G06F 21/78* (2013.01)

(58) Field of Classification Search
CPC ...................................................... G06F 21/575
USPC ............................................................ 726/2
See application file for complete search history.

(56) References Cited

U.S. PATENT DOCUMENTS

| | | | | |
|---|---|---|---|---|
| 5,680,455 | A | * | 10/1997 | Linsker et al. ................ 380/246 |
| 6,061,794 | A | * | 5/2000 | Angelo et al. .................... 726/3 |
| 6,249,872 | B1 | * | 6/2001 | Wildgrube et al. ............... 726/2 |
| 6,510,521 | B1 | | 1/2003 | Albrecht et al. |
| 2003/0041239 | A1 | * | 2/2003 | Shear et al. .................... 713/156 |
| 2004/0243759 | A1 | | 12/2004 | Itoh et al. |
| 2005/0246771 | A1 | * | 11/2005 | Hunt et al. ....................... 726/18 |
| 2006/0020821 | A1 | * | 1/2006 | Waltermann et al. ......... 713/189 |
| 2006/0173694 | A1 | * | 8/2006 | Itabashi ............................ 705/1 |
| 2007/0143606 | A1 | * | 6/2007 | Bandholz et al. ............. 713/168 |
| 2009/0276844 | A1 | * | 11/2009 | Gehrmann et al. ............. 726/16 |
| 2010/0254537 | A1 | * | 10/2010 | Buer et al. ...................... 380/279 |
| 2011/0252227 | A1 | * | 10/2011 | Strong et al. .................. 713/151 |
| 2011/0258410 | A1 | | 10/2011 | Lambert et al. |

\* cited by examiner

*Primary Examiner* — Morshed Mehedi
(74) *Attorney, Agent, or Firm* — Larson Newman, LLP

(57) ABSTRACT

An information handling system includes a host mapped general purpose input output (GPIO), a shared memory, a board management controller, and a cryptography engine. The host mapped GPIO includes a plurality of registers. The board management controller is in communication with the host mapped GPIO and with the shared memory, and is configured to control accessibility to the plurality of registers in the GPIO, and to control write accessibility of the shared memory based on a private key received from a basic input output system requesting accessibility to the plurality of registers and write accessibility of the shared memory. The cryptography engine is in communication with the board memory controller, and is configured to authenticate the private key received from the board management controller.

20 Claims, 5 Drawing Sheets

SELECTIVE MANAGEMENT CONTROLLER AUTHENTICATED ACCESS CONTROL TO HOST MAPPED RESOURCES

CROSS REFERENCE TO RELATED APPLICATIONS

This application is a continuation of U.S. patent application Ser. No. 12/762,671, entitled "Selective Management Controller Authenticated Access Control to Host Mapped Resources," filed on Apr. 19, 2010, the disclosure of which is hereby expressly incorporated by reference in its entirety.

FIELD OF THE DISCLOSURE

This disclosure relates generally to information handling systems, and more particularly relates to a method for selective management controller authenticated access control to host mapped resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system, such as a computer or a server, can include components such as a host mapped general purpose input/output (GPIO), a shared memory, a basic input output system (BIOS), and the like. The host mapped GPIO and shared memory can be accessed by the BIOS of the information handling system to have different operations performed on the host mapped GPIO and the shared memory. Input/output registers of the host mapped GPIO and the shared memory locations can be directly accessible by a host, such as the BIOS, of the information handling system and can also be accessible through a board management controller (BMC) of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
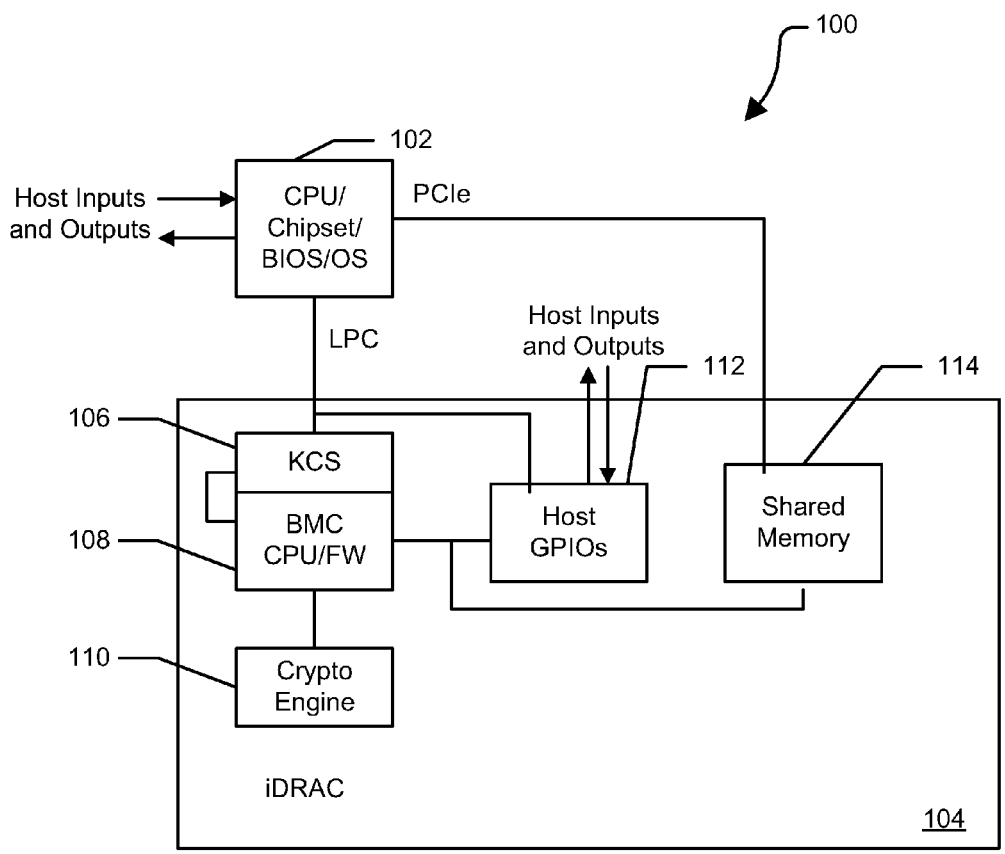
FIG. 1 is a block diagram of an information handling system.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system 100 includes a basic input output system (BIOS) 102 and an interactive Dell remote access controller (iDRAC) 104, which in turn includes a keyboard controller style (KCS) 106, a board management controller (BMC) 108, a cryptography engine 110, a host mapped general purpose input output (GPIO) 112, and a shared memory 114. The BIOS 102 includes host input and output terminals, and first and second terminals. The KCS 106 includes a first terminal, and a second terminal connected to the second terminal of the BIOS 102. The BMC 108 includes a first terminal connected to the first terminal of the KCS 106, and second and third terminals. The cryptography engine 110 includes a terminal connected to the third terminal of the BMC 108. The host mapped GPIO 112 includes a first terminal connected to the second terminal of the BMC 108, a second terminal connected to the second terminal of the BIOS 102, and host input and output terminals. The shared memory 114 includes a first terminal connected to the first terminal of the BIOS 102, and a second terminal connected to the second terminal of the BMC 108.

In an embodiment, the BIOS 102 can connect with the host mapped GPIO 112 via a low pin count (LPC) bus, and the BIOS can connect with the shared memory 114 via a peripheral component interconnect express (PCIe) bus. In different embodiments, the iDRAC 104 can be any similar remote access controller, and the BIOS 102 can be a central processing unit, a chipset, an operating system, or the like.

During a manufacturing process of the information handling system 100, input/output registers of the host mapped GPIO 112 can have a default setting of full read and write and/or can be assigned as both an input and an output, and the shared memory 114 can have a default setting of full read/write accessibility. A system service tag can then be set for the host mapped GPIO 112, and the BIOS 102 and the BMC 108 can be provided with access to the system service tag. At the end of the manufacturing process, a diagnostics system can read the system service tag and derive a private key for the host mapped GPIO 112 and the shared memory 114. In another embodiment, the host mapped GPIO 112 and the shared memory 114 can have separate private keys derived for each of the host mapped GPIO and the shared memory, or the host mapped GPIO and the shared memory can have the same private key.

The diagnostics system can then send the private key to the BMC 108 via the KCS 106, and the BMC can attempt to write the private key into the cryptography engine 110. If the private key is successfully written in the cryptography engine 110, the BMC can return a pass status for the private key to the diagnostics system, and the information handling system 100 can be made ready for shipping. However, if the private key is not successfully written in the cryptography engine 110, the BMC can return a fail status for the private key to the diagnostics system, and a manufacturing failure can be determined for the information handling system 100.

During a power-on self-test (POST) of the information handling system 100, the input/output registers of the host mapped GPIO 112 can have a default setting of full host control, and the shared memory 114 can have a default setting of full read/write accessibility. However at the end of the POST, the BIOS 102 preferably sends a command to the BMC 108 to lock all of the states of the input/output registers of the host mapped GPIO 112, such that the registers that are set as an input are locked as an input register and the registers that are set as an output are locked as an output register. The BIOS 102 can also send a command to the BMC 108 to write protect the shared memory 114. When the BMC 108 performs these commands the host mapped GPIO 112 and the shared memory 114 can be protected from a malicious or inadvertent operating system application code that may access or manipulate the host mapped GPIO or the shared memory. The malicious or inadvertent operating system application code may result in instability, reduce reliability, create false alerts, and in extreme cases cause permanent electrical damage to the information handling system 100.

During a runtime of the information handling system 100, the BIOS 102 may need to change an input/output state of one or more of the registers of the host mapped GPIO 112 or may need to write data to the shared memory 114. If the BIOS 102 needs to change the input/output state of one or more of the registers of the host mapped GPIO 112, the BIOS can send an unlock request for the host mapped GPIO along with the private key for the host mapped GPIO to the BMC 108 via the KCS 106. The BMC 108 can send the private key to the cryptography engine 110 for authentication.

If the BMC 108 receives a signal from the cryptography engine 110 indicating that the private key is not authenticated, the one or more of the registers of the host mapped GPIO 112 can remain locked. However, if authentication of the private key is received from the cryptography engine 110, the BMC 108 can unlock one or more of the registers of the host mapped GPIO 112. When the one or more of the registers of the host mapped GPIO 112 are unlocked, the BIOS 102 can send control signals to the host mapped GPIO via the LPC bus to change the input/output state of the one or more registers.

If the BIOS 102 needs to write data to the shared memory 114, the BIOS can send a full read/write permission request for the shared memory along with the private key for the shared memory to the BMC 108 via the KCS 106. The BMC 108 can then send the private key to the cryptography engine 110 for authentication. If the BMC 108 receives a signal from the cryptography engine 110 indicating that the private key is not authenticated, the shared memory 114 can remain write-protected. However, if authentication of the private key is received from the cryptography engine 110, the BMC 108 can grant full read/write accessibility of the shared memory 114 to the BIOS 102. When the full read/write accessibility of the shared memory 114 is provided, the BIOS 102 can send data to be written in the shared memory via the PCIe bus.

When the runtime write, such as the change in the input/output state of the one or more registers of the host mapped GPIO 112 or writing data to the shared memory 114, is completed, the BMC 108 can lock all of the input/output registers of the host mapped GPIO and can write protect the shared memory. In another embodiment, the BMC 108 can lock all of the input/output registers of the host mapped GPIO 112 and can write protect the shared memory 114 when a specific amount of time has passed, a specific number of transactions has been completed, a single transaction has been completed, or the like as measured from when the host mapped GPIO was unlocked or the shared memory was available as full read/write accessibility. The specific amount of time and the specific number of transactions can be programmable by a user of the information handling system 100, by the BIOS 102, by the BMC 108, or the like. The BMC 108 can also keep the input/output registers of the host mapped GPIO 112 unlocked and the shared memory 114 as full read/write accessible until the BIOS 102 sends a signal to explicitly lock the input/output registers and to write protect the shared memory. Thus, the BMC 108 can control access to the host mapped GPIO 112 and the shared memory 114 to provide protection from any malicious or inadvertent operating system application codes that may try to access and manipulate the host mapped GPIO or the shared memory. In another embodiment, the BMC 108 can control access to any other protectable memory, protectable host accessible resource, or the like.

Figure 2:
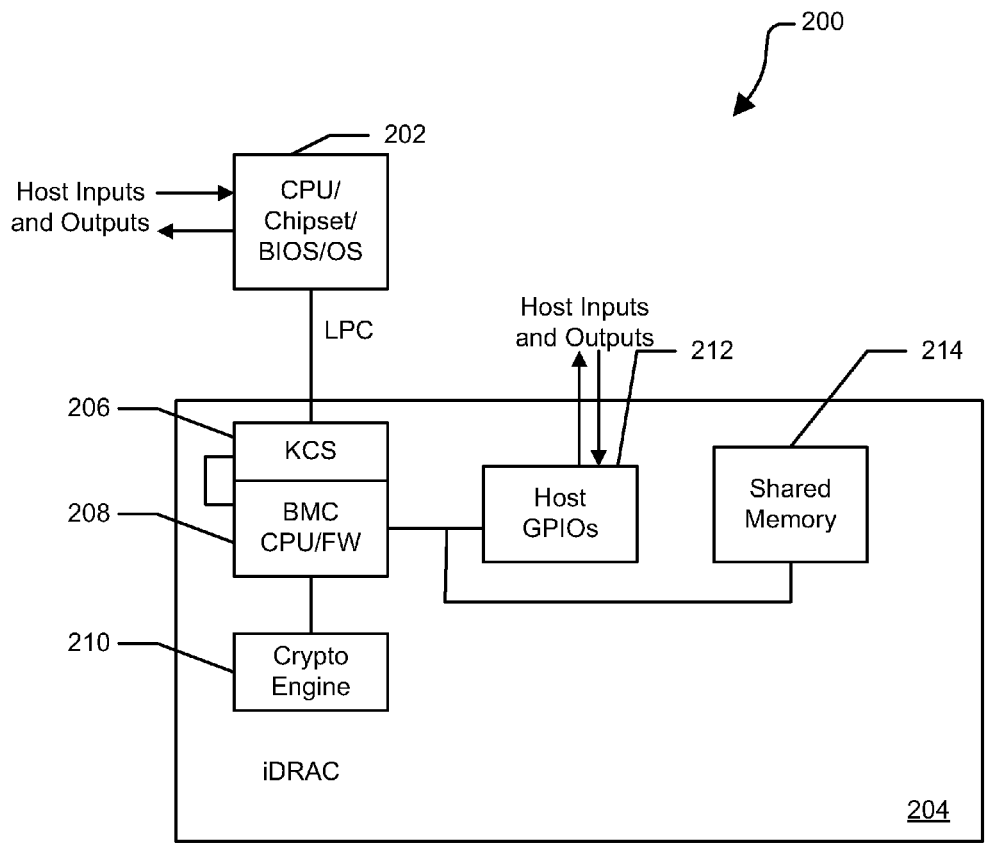
FIG. 2 is a block diagram of an alternative embodiment of the information handling system.

FIG. 2 shows an information handling system 200 including a BIOS 202 and an iDRAC 204, which in turn includes a KCS 206, a BMC 208, a cryptography engine 210, a host mapped GPIO 212, and a shared memory 214. The BIOS 202 includes host input and output terminals, and a first terminal. The KCS 206 includes a first terminal, and a second terminal connected to the first terminal of the BIOS 202. The BMC 208 includes a first terminal connected to the first terminal of the KCS 206, and second and third terminals. The cryptography engine 210 includes a terminal connected to the third terminal of the BMC 208. The host mapped GPIO 212 includes a first terminal connected to the second terminal of the BMC 208, and host input and output terminals. The shared memory 214 includes a first terminal connected to the second terminal of the BMC 208.

The embodiment of the information handling system 200 of FIG. 2 can differ from the information handling system 100 of FIG. 1, such that the BMC 208 preferably operates as a proxy for the BIOS 202. Thus, the BIOS 202 preferably sends transaction requests to the BMC 208 along with a private key associated with each transaction request, and the BMC can then perform the operation requested by the BIOS instead of the BMC granting the BIOS access to the host mapped GPIO 212 and/or the shared memory 214. For example, if the BIOS 202 attempts to change an input/output state of one or more of the input/output registers of the host mapped GPIO 212, the BIOS can send a transaction request for the input/output state change to the BMC along with an associated private key. The transaction request and the private key are preferably sent to the BMC 208 via the KCS 206. When the BMC 208 receives the transaction request and the private key, the BMC can pass the private key to the cryptography engine 210 for authentication. When the BMC 208 receives the authentication of the private key from the cryptography engine 210, the BMC can change the input/output state of the one or more input/output registers of the host mapped GPIO 212 as requested by the BIOS 202.

The BIOS 202 can similarly send the BMC 208 a transaction request to write data to the shared memory 214 along with a private key for the transaction. When the BMC 208 receives the authentication of the private key from the cryptography engine 210, the BMC can write the data sent from the BIOS 202 to the shared memory. In an embodiment, the BMC 208 can receive transaction requests from the BIOS 202, a central processing unit, a chipset, and an operating system of the information handling system 200. Each of the transaction requests can be sent to the BMC 208 along with a private key, and the transaction requests can be received by the BMC at substantially the same time. The BMC 208 can then perform each of the transaction requests in the order that the private keys are authenticated by the cryptography engine 210. Thus, the BMC 208 operates in this embodiment as a proxy for the BIOS 202, such that the BMC does not have to lock and unlock the input/output registers of the host mapped GPIO 212 or provide full read and write accessibility of the shared memory 214 because the BMC is the only device with access to the host mapped GPIO and the shared memory.

Figure 3:
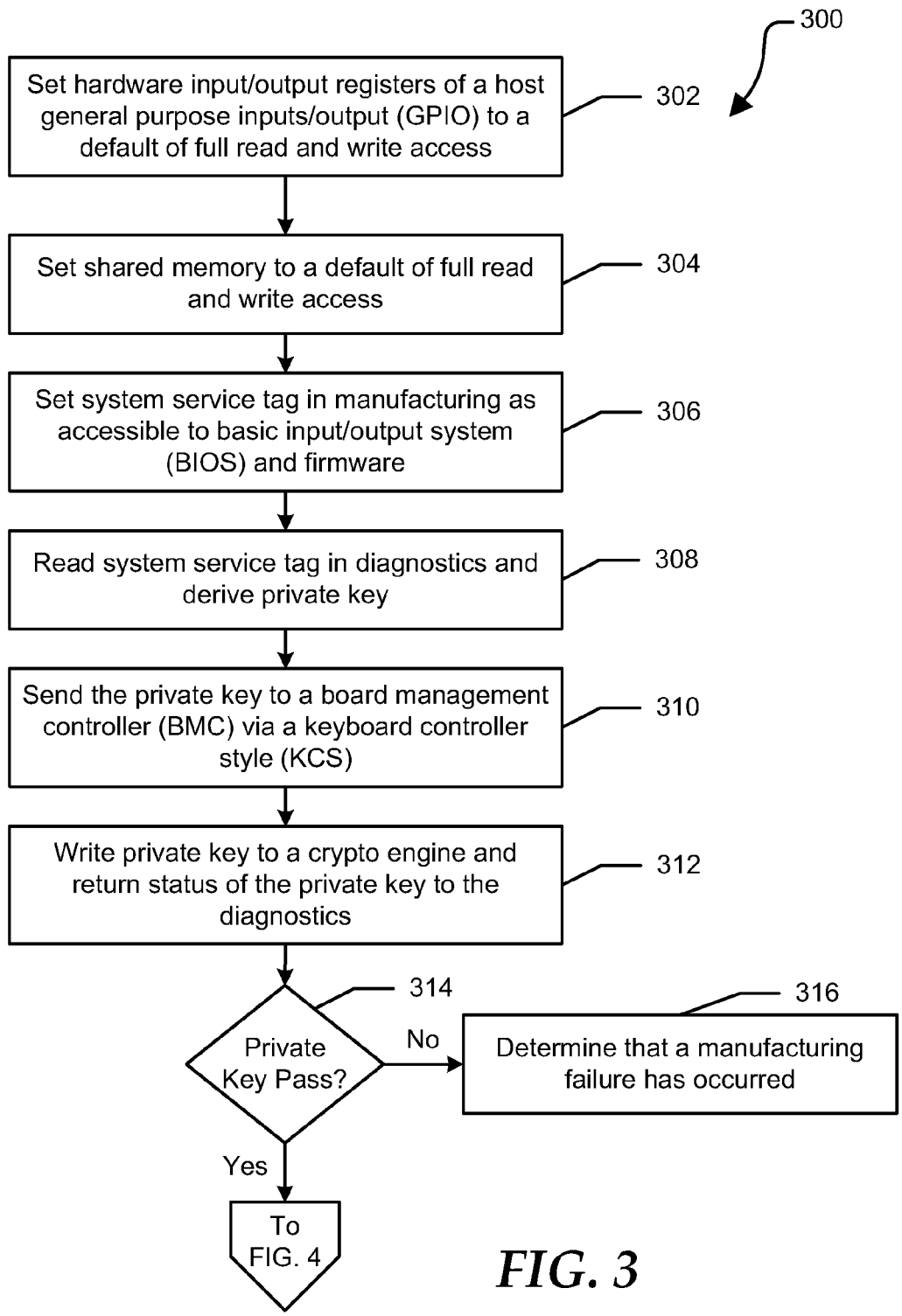
FIGS. 3 and 4 are a flow diagram of a method for selectively authenticating access to host mapped resources of the information handling system.
Figure 4:
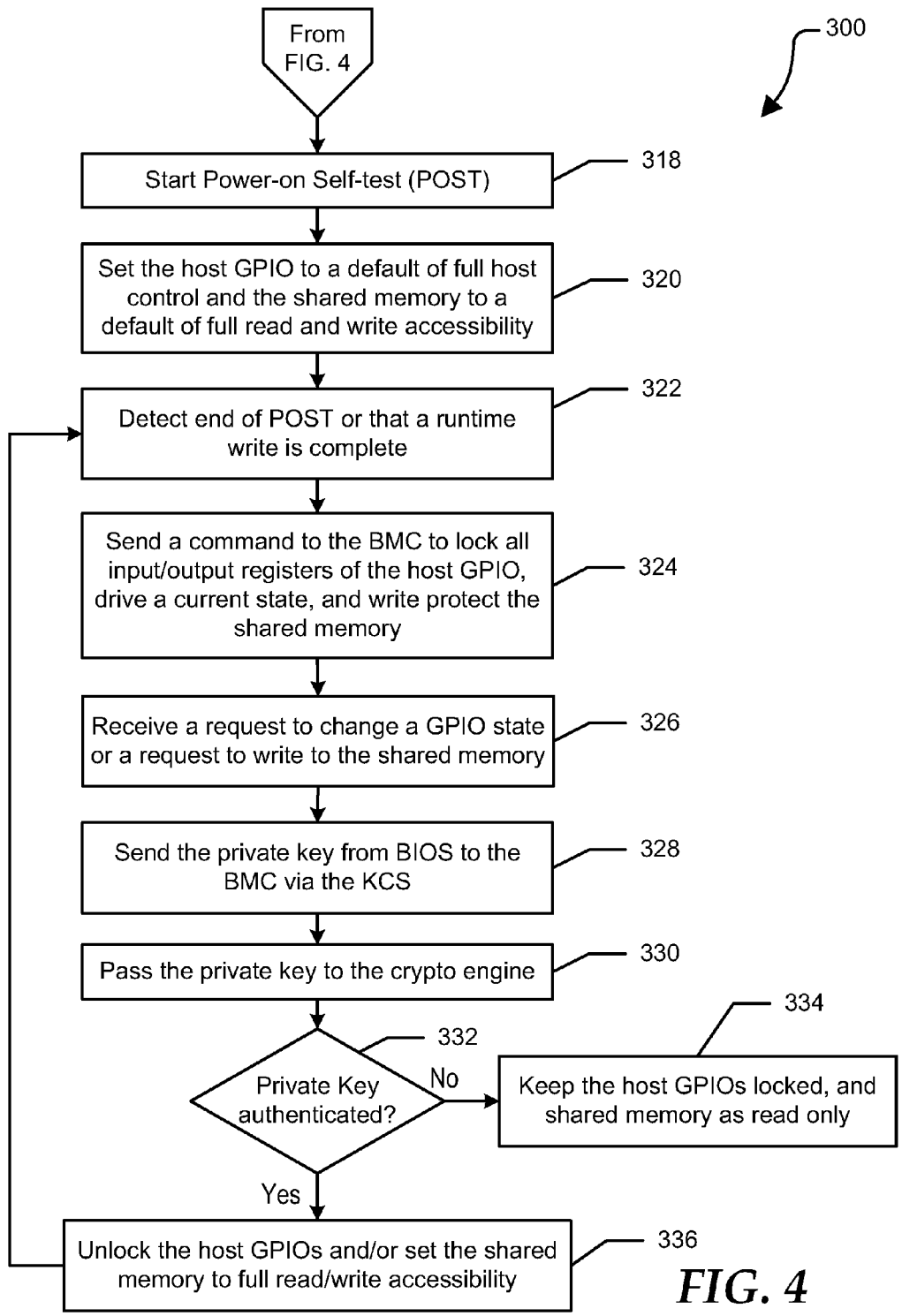

FIGS. 3 and 4 show a flow diagram of a method 300 for selectively authenticating access to host mapped resources of the information handling system. At block 302, a hardware host mapped GPIO is set to a default of full read and write access. A shared memory is set to a default of full read and write access at block 304. At block 306, a system service tag is set in a manufacturing process and is made accessible to BIOS and firmware of the information handling system. The system service tag is read in a diagnostics and a private key is derived from the system service tag at block 308.

At block 310, the private key is sent to a BMC via a KCS. The private key is written to a cryptography engine and the status of the private key is returned to the diagnostics at block 312. If the status of the private key is a failure status, a determination is made that a manufacturing failure has occurred at block 316. However, is the status of the private key is a pass status, the manufacturing process can be completed and the information handling system can be shipped.

At block 318, a POST is started. The host mapped GPIO is set to a default of full host control and the shared memory is set to a default of full read and write accessibility during the POST at block 320. At block 322, an end of the POST or a completion of a runtime write is detected. At block 324, a command is sent to the BMC to lock all of the input/output registers of the host mapped GPIO, to drive a current state, and to write protect the shared memory.

At block 326, a request to change an input/output state of a register of the GPIO or a request to write to the shared memory is received. A private key is sent from the BIOS to the BMC via the KCS at block 328. The private key is preferably sent along with the request to change the input/output state of a register of the GPIO or the request to write to the shared memory. At block 330, the private key is passed to the cryptography engine. At block 332, a determination is made whether the private key is authenticated. If the private key is not authenticated, the input/output registers of the host mapped GPIO are kept locked, and the shared memory is kept as read only at block 334. However, if the private key is authenticated, the input/output registers of the host mapped GPIO are unlocked, and the shared memory is set to full read/write accessibility at block 336 and the flow diagram continues as stated above at block 322.

Figure 5:
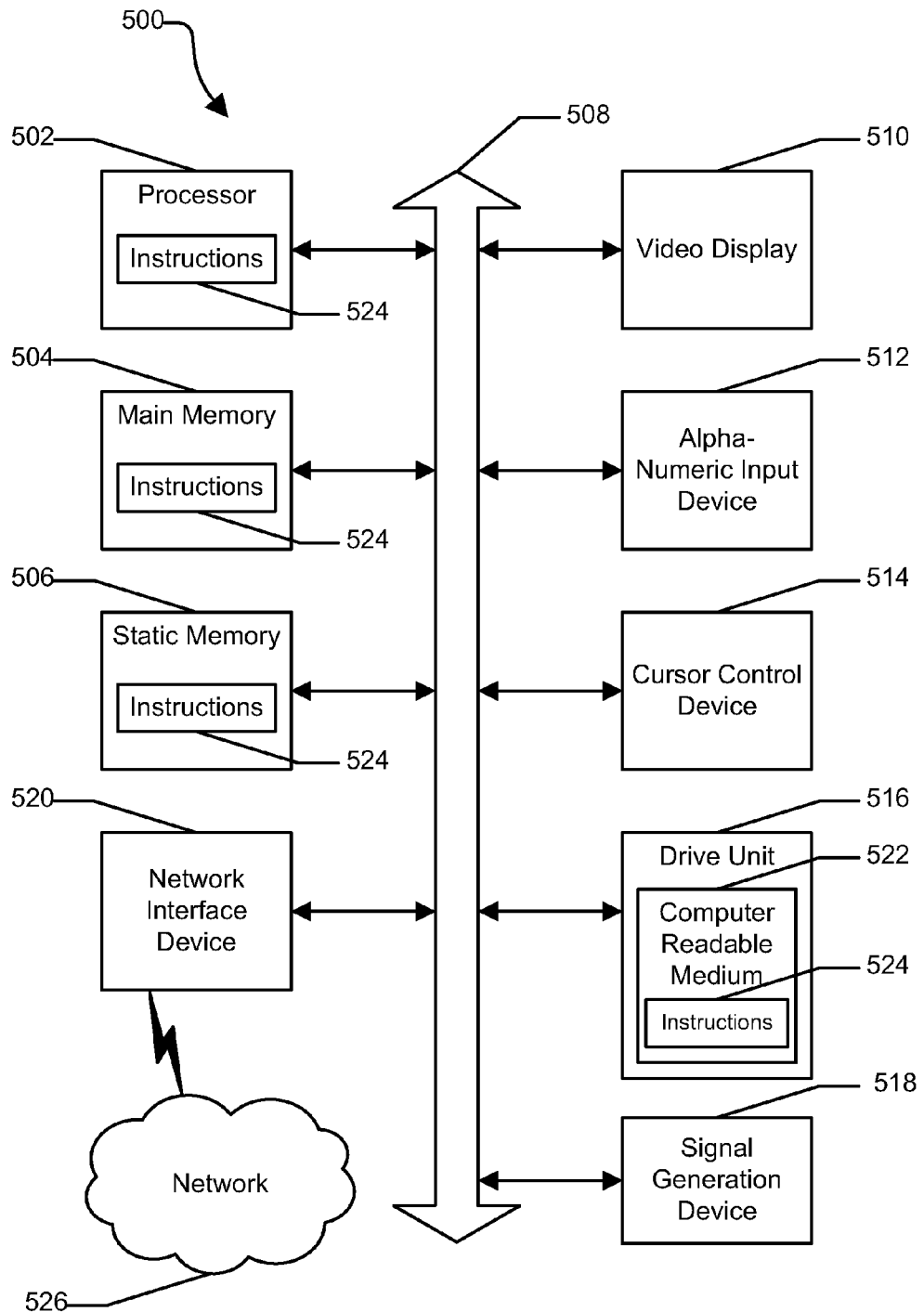
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a host mapped general purpose input output (GPIO) including a plurality of registers, wherein a first register includes a system service tag associated with the information handling system;
    a host processor in communication with the host mapped GPIO, the host processor including a basic input output system;
    a board management controller separate from the host processor and in communication with the host mapped GPIO, the board management controller configured to control accessibility to the registers in the GPIO based on a private key received from the basic input output system requesting accessibility to the registers, wherein the private key is based on the system service tag; and
    a cryptography engine in communication with the board management controller, the cryptography engine configured to authenticate the private key received from the board management controller.

2. The information handling system of claim 1, further comprising:
    a keyboard controller style in communication with the board management controller, the keyboard controller style configured to pass the private key from the basic input output system to the board management controller.

3. The information handling system of claim 1, wherein the specific number of transactions of the basic input output system is a programmable number of transactions.

4. The information handling system of claim 1, wherein the board management controller is further configured to provide accessibility to the host mapped GPIO for a specific number of transactions of the basic input output system when the private key is authenticated.

5. The information handling system of claim 4, wherein the board management controller provides accessibility to the host mapped GPIO for a specific amount of time when the private key is authenticated.

6. The information handling system of claim 5, wherein the specific amount of time is a programmable amount of time.

7. The information handling system of claim 1, wherein the board management controller provides accessibility to the host mapped GPIO until the basic input output system explicitly locks the host mapped GPIO.

8. The information handling system of claim 1, wherein the plurality of registers is locked upon an end of a power-on self-test of the system.

9. A method comprising:
    detecting, at a host processor of an information handling system, at least one of an end of a power-on self-test and completion of a runtime write;
    setting, by a board management controller of the information handling system, a host mapped general purpose input output (GPIO) register in a locked state in response to the end of the power-on self-test or to the completion of the runtime write, wherein the GPIO register includes a system service tag associated with the information handling system, and wherein the board management controller is separate from the host processor;
    receiving a request to change an input/output state of the host mapped GPIO register;

receiving, at the board management controller, a private key with the request, wherein the private key is received from a basic input output system of the host processor and is generated based upon the system service tag;

passing the private key to a cryptography engine;

receiving an indication that the private key is authenticated from the cryptography engine; and setting, by the board management controller, the host mapped GPIO register to an unlock state when the private key is authenticated.

10. The method of claim 9, further comprising:

determining that a specific number of transactions have occurred; and setting the host mapped GPIO register in the locked state when the specific number of transactions have occurred.

11. The method of claim 9, further comprising:

determining that a specific amount of time has occurred; and setting the host mapped GPIO register in the locked state when the specific amount of time has occurred.

12. The method of claim 9, wherein the host mapped GPIO register is located on a remote access controller.

13. The method of claim 9, wherein the authentication of the private key is performed on a remote access controller.

14. The method of claim 9, wherein the request is received from the basic input output system.

15. A non-transitory computer-readable medium including code for performing a method, the method comprising:

detecting, at a host processor of an information handling system, at least one of an end of a power-on self-test and completion of a runtime write;

setting, by a board management controller of the information handling system, a host mapped general purpose input output (GPIO) register in a locked state in response to the end of the power-on self-test or to the completion of the runtime write, wherein the GPIO register includes a system service tag associated with the information handling system, and wherein the board management controller is separate from the host processor;

receiving a request to change an input/output state of the host mapped GPIO register;

receiving, at the board management controller, a private key with the request, wherein the private key is received from a basic input output system of the host processor and is generated based upon the system service tag;

passing the private key to a cryptography engine;

receiving an indication that the private key is authenticated from the cryptography engine; and setting, by the board management controller, the host mapped GPIO register to an unlock state when the private key is authenticated.

16. The computer-readable medium of claim 15, the method further comprising:

determining that a specific number of transactions have occurred; and setting the host mapped GPIO register in the locked state when the specific number of transactions have occurred.

17. The computer-readable medium of claim 15, the method further comprising:

determining that a specific amount of time has occurred; and setting the host mapped GPIO register in the locked state when the specific amount of time has occurred.

18. The computer-readable medium of claim 15, wherein the host mapped GPIO register is located on a remote access controller.

19. The computer-readable medium of claim 15, wherein the authentication of the private key is performed on a remote access controller.

20. The computer-readable medium of claim 15, wherein the request is received from the basic input output system.

* * * * *